US007065232B2

(12) United States Patent  
Geng

(10) Patent No.: US 7,065,232 B2  
(45) Date of Patent: Jun. 20, 2006

(54) THREE-DIMENSIONAL EAR BIOMETRICS SYSTEM AND METHOD

(75) Inventor: Z. Jason Geng, Rockville, MD (US)

(73) Assignee: Genex Technologies, Inc., Kensington, MD (US)

( * ) Notice: Subject to any disclaimer, the term of this patent is extended or adjusted under 35 U.S.C. 154(b) by 0 days.

(21) Appl. No.: 10/769,393

(22) Filed: Jan. 30, 2004

(65) Prior Publication Data

US 2004/0218788 A1 Nov. 4, 2004

Related U.S. Application Data

(60) Provisional application No. 60/443,990, filed on Jan. 31, 2003.

(51) Int. Cl.
*G06K 9/00* (2006.01)
(52) U.S. Cl. .................................................. 382/115
(58) Field of Classification Search ................ 382/100, 382/115–118, 154; 356/601–604; 345/419–420
See application file for complete search history.

(56) References Cited

U.S. PATENT DOCUMENTS 6,002,782 A * 12/1999 Dionysian ................... 382/118
6,028,672 A 2/2000 Geng
6,137,896 A * 10/2000 Chang et al. ................ 382/118
6,147,760 A 11/2000 Geng
6,556,706 B1 4/2003 Geng
6,975,750 B1 * 12/2005 Yan et al. .................... 382/118

OTHER PUBLICATIONS

Bhanu et al., Human Ear Recognition in 3D, University of California, Center for Research in Intelligent SDystems, pp. 91-98.*
Geng, Rainbow three-dimensional camera, Opt. Eng. 0091-3286/96, 376-383.*
Geng, Face Cam, spie 0277-786X/04, 316-327.*
Mark Burge and Wilhelm Burger, "Ear Biometrics in Computer Vision," IEEE, Pattern Recognition, 2000. Proceedings. 15th International Conference. Sep. 3-7, 2000. pp. 822-826.
B. Victor, K. Bowyer, S. Sarkar, "An Evaluation of Face and Ear Biometrics." IEEE Pattern Recognition, 2002. 16th International Conference. Aug. 11-15, 2003. pp. 429-432..

* cited by examiner

*Primary Examiner*—Joseph Mancuso
*Assistant Examiner*—Ishrat Sherali
(74) *Attorney, Agent, or Firm*—Steven L. Nichols; Rader, Fishman & Grauer PLLC

(57) ABSTRACT

A method of automatic human identification includes matching an image of a subject's ear against a database of images of ears from identified people to identify the subject.

33 Claims, 11 Drawing Sheets

200

THREE-DIMENSIONAL EAR BIOMETRICS SYSTEM AND METHOD

RELATED APPLICATIONS

The present application claims priority under 35 U.S.C. § 119(e) from the following previously-filed Provisional Patent Application, U.S. Application No. 60/443,990, filed Jan. 31, 2003 by Geng, entitled "Novel three-dimensional ear biometrics technique for improving the performance of video-based surveillance and human identification systems in protecting highly secured facilities" which is incorporated herein by reference in its entirety.

BACKGROUND

Many well-known biometrics technologies such as automatic facial identification systems (AFIS) have been developed during the past decade and we are now beginning to see their practical deployments in security and surveillance systems. However, video-based AFIS systems suffer difficulties in handling a wide variety of imaging conditions and are very sensitive to variations in lighting conditions and subject orientation. A successful AFIS application often requires the capturing of a well-lit, frontal view facial image. However, as illustrated by the exemplary surveillance image (200) illustrated in FIG. 2, a significant portion of video surveillance images, especially those located in highly secured areas, are acquired by video cameras located to the side of potential subjects (such as in airport tarmac walkway, building hallway, parking lots, and conference/briefing rooms). Consequently, these surveillance images (200) are often partial face images that cause the existing facial identification systems to be vulnerable to mis-identification.

In addition to the above-mentioned challenges, the human face is arguably the most alterable part of the body due to modifiable characteristics such as facial expressions, cosmetics, facial hair, and hairstyle. This ability to alter the appearance of the human face adds to the challenges in utilizing a practical facial identification system as a stand-alone solution to video-based surveillance applications.

Moreover, the capabilities of current biometric human identification systems such as fingerprint, hand geometry, retina scanning, iris, face, and voice recognition are very limited in their surveillance applications. The shortcomings of the current biometric human identification systems include such things as requiring a subject being identified to be cooperative, requiring a subject being identified to be positionally close to the acquisition sensors (for example, the best face identification systems available now can only function when a frontal image is taken within a 15-degree angle of the frontal orientation and within maximum 10 feet distance from the camera), and only being configured to be used for access control rather than for surveillance. Consequently, current biometric human identification techniques at their present sophistication levels cannot meet pressing needs for identifying and tracking human subjects at a distance to enhance personal and building security.

In contrast to the rarely used identification systems illustrated above, remotely controlled video cameras have been widely used for both surveillance and security monitoring. Most video surveillance systems (such as Pan/Tilt/Zoom video cameras) entail a man-in-the-loop to monitor video images and determine if a person displayed on a monitor poses a threat. According to the American Society for Industrial Security (ASIS), there are over 1 million Pan/Tilt/Zoom (PTZ) cameras currently deployed in various surveillance systems in the United States alone. However, many of the existing PTZ cameras are under utilized since they cover only a small portion of a surveyed area at any given time and there are not enough human operators available to manually point the PTZ cameras to track suspicious events and people.

Consequently, a need exists for a surveillance system that improves upon the capabilities of current biometric human identification systems while incorporating already deployed PTZ cameras.

SUMMARY

A method of automatic human identification includes matching an image of a subject's ear against a database of images of ears from identified people to identify the subject.

BRIEF DESCRIPTION OF THE DRAWINGS

The accompanying drawings illustrate various embodiments of the present method and system and are a part of the specification. The illustrated embodiments are merely examples of the present system and method and do not limit the scope thereof.

FIG. 4 is a flow chart illustrating a three-dimensional ear biometrics identification method according to one exemplary embodiment.

Throughout the drawings, identical reference numbers designate similar, but not necessarily identical, elements.

DETAILED DESCRIPTION

Figure 1:
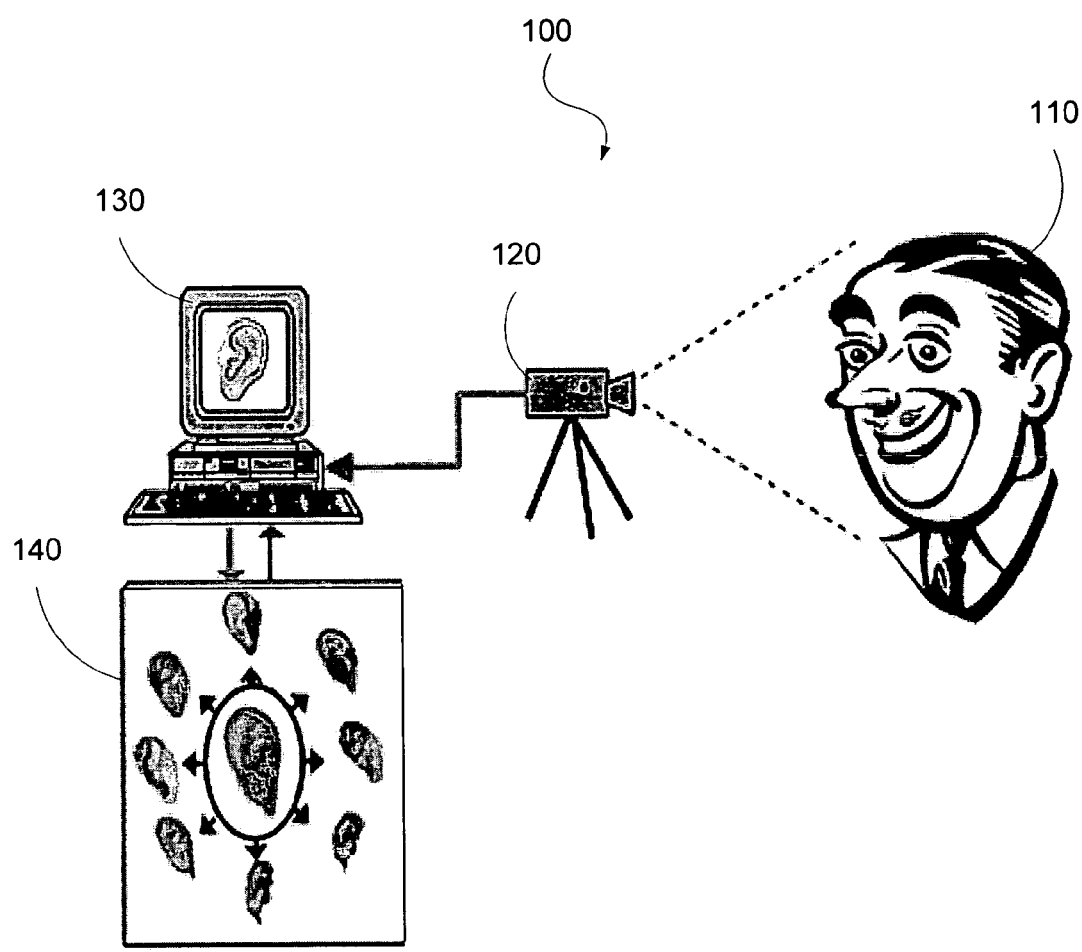
FIG. 1 is a simple system diagram illustrating the formation of an ear biometrics database according to one exemplary embodiment.
Figure 2:
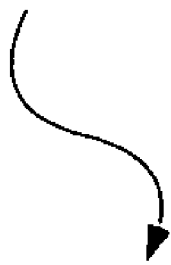
Figure 2:

A method and an apparatus for a three-dimensional ear biometrics technique are described herein. More specifically, the present system and method for performing a 3D ear biometrics technique comprises two major components: first, a 3D ear model database is established using 3D enrollment software, and second, an effective ear matching algorithm is performed on monitored ears. The present specification presents a number of detailed exemplary systems and methods for performing the present 3D ear biometrics technique.

As used in this specification and in the appended claims, the term "biometrics" is meant to be understood broadly as any method concerning the reading of the measurable, biological characteristics of an individual in order to identify them to a computer or other electronic system. Additionally, the term "2 dimensional" or "2D" is meant to be used interchangeably as referring to any image or object that is displayed in only two dimensions, that is, lacking the expected range or depth. In contrast, the term "3 dimensional" or "3D" is meant to refer to any object or image that is displayed or represented in three dimensions, namely, having depth or range.

The term "white light" is meant to be understood broadly as referring to humanly visible light consisting of a spectrum of wavelengths, which range from approximately 700 nanometers (nm) to approximately 100 nm. Similarly, the term "ultraviolet" or "UV" is meant to be understood as any wave of electromagnetic radiation having a higher frequency than visible light. Similarly, the term "infrared" is meant to be understood broadly as any wave of electromagnetic radiation having a frequency lower than visible light.

The term "eigenvector" is meant to be understood as non-zero vectors of a linear operator which, when operated on by the operator, result in the scalar multiple of themselves. This scalar is known as an "eigenvalue" associated with the eigenvector.

As used in the present specification and in the appended claims, the phrase "CCD" or "charge-coupled device" is meant to be understood as any light-sensitive integrated circuit that stores and displays the data for an image in such a way that each pixel (picture element) in the image is converted into an electrical charge, the intensity of which is related to a color in the color spectrum. Also, the term "monochromatic" refers to any electromagnetic radiation having a single wavelength. The term "Rainbow-type image" or "Rainbow-type camera" is meant to be understood as an image or a camera configured to collect an image that may be used to form a three-dimensional image according to triangulation principles.

In the following description, for purposes of explanation, numerous specific details are set forth in order to provide a thorough understanding of the present system and method for a three-dimensional ear biometrics technique. It will be apparent, however, to one skilled in the art that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Ear Biometrics

When compared with the well developed descriptions for detailed facial expressions, the standard vocabulary used to describe ear structure is insufficient. Common vocabularies are often limited to a few vague and generic terms when describing the human ear including such terms as large or floppy, none of which are solely used for describing ears.

Figure 3:
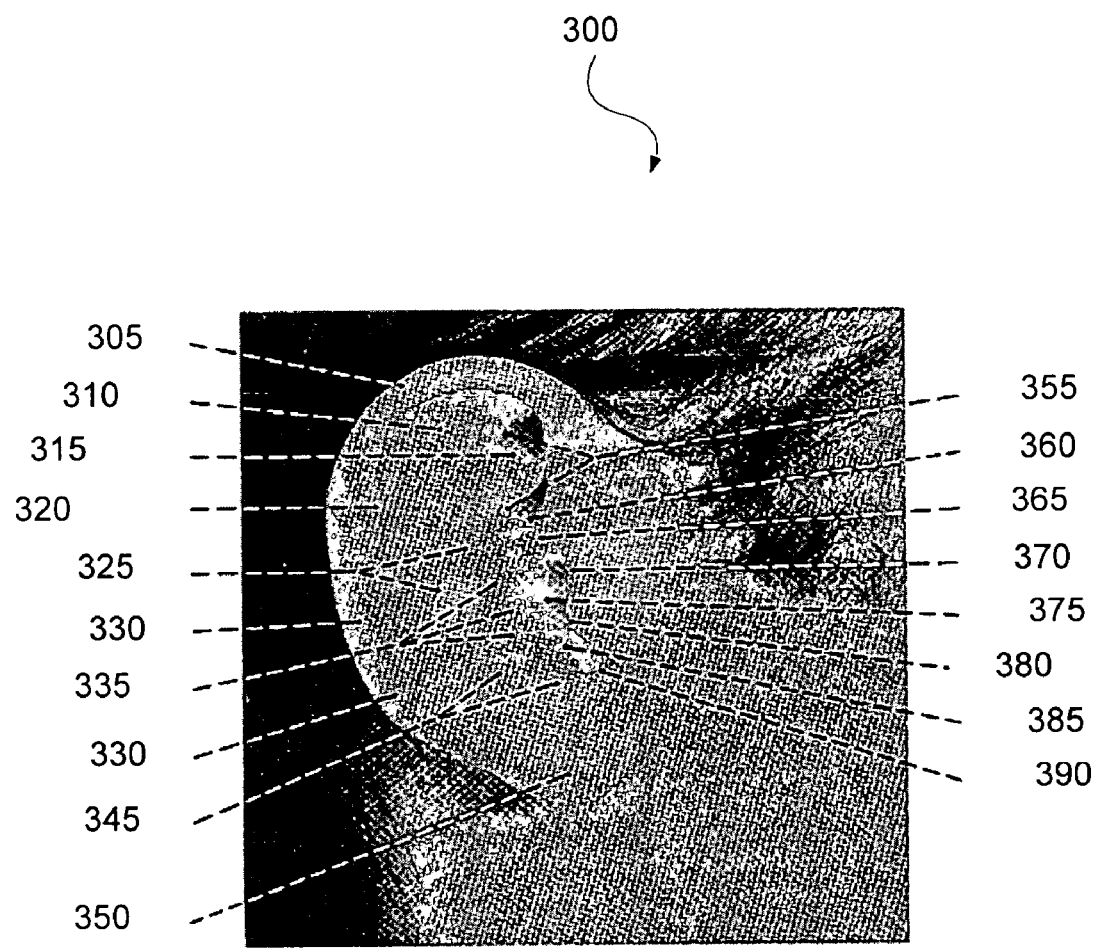
FIG. 3 is a simple illustration showing a surveillance side view of a subject according to one exemplary embodiment.

However, as illustrated in FIG. 3, ears have a rich set of geometric features. As illustrated in FIG. 3, the two parts of the external ear are the auricle (300) (the projecting part of the ear, consisting of skin overlaying an irregularly shaped elastic fibrocartilage), and the external acoustic meatus (the ear canal coursing through the auricle to the tympanic membrane). For ear-ID study, we are interested in the auricle portion (300) of the external ear. The auricle portion (300) of the ear includes a number of biometrically identifiable points of interest. As illustrated in FIG. 3, the auricle includes a helix (305), a scaphoid fossa (310), a triangular fossa (315), an auricular tubercle (Darwin) (320), an antihelix (325), a helix (330), a concha of the ear (335), an antitragus (345), a lobule of the ear (350), a crura of antihelix (355), a cymba conochae (360), a crus of helix (365), an anterior notch (370), a cavum conchae (375), a tragus (380), a cavum conchae (385), and an intertragic incisure (390). All of these biometrically identifiable points may be combined to identify a person of interest.

In proposing the ear as the basis for a new class of biometrics, a number of characteristics of the ear were considered. In the ear biometrics case, universality, uniqueness, permanence, collectability, acceptability, and circumvention were examined.

Utilizing the ear as the basis for a new class of biometrics is initially promising due to the universality of the human ear. Practically every human being has ears. Moreover, according to published forensic research data, no two persons have the same biometric ear characteristics. Police forensic examiner Alfred Iannarelli in California, an authority figure in the ear forensic examination, performed two studies in 1989 on ears. The first study compared over 10,000 ears drawn from a randomly selected sample in California, and the second study examined fraternal and identical twins, in which physiological features are known to be similar. The evidence from these studies supports the hypothesis that the ear contains unique physiological features, since in both studies all examined ears were found to be unique though identical twins were found to have similar, but not identical, ear structures especially in the Concha and lobe areas.

Additionally, the structure of the ear (in contrast to the hearing capability) does not change radically over time. Medical literature suggests that ear growth after the first four months of birth is proportional, while gravity can cause the ear to undergo stretching in the vertical direction. The effect of this stretching is most pronounced in the lobe of the ear and measurements show that the change is non-linear. The rate of stretching is approximately five times greater than normal during the period from four months to the age of eight, after which it is constant until around 70 when it again increases.

Moreover, ear images are readily collectable. That is, ear identification relies upon video images, which are not intrusive and can be obtained via existing video surveillance cameras. With the present exemplary ear biometrics system, accurate ear and facial images can be obtained in passive surveillance scenarios. In contrast, many other biometrics techniques such as Deoxyribonucleic Acid (DNA) analysis require a blood or other intrusive bodily sample. Since the ear identification can be performed in a non-intrusive and passive fashion via surveillance video images, social acceptance for using such technology is not a problem in the applications for protecting highly secured facilities.

Also, ear biometrics techniques are difficult to circumvent. When utilized in an access control application, unless someone had surgery on his/her ears, it is very difficult to fool the ear identification system. In the surveillance mode, however, image of ears may be occluded by a person's hair or a hat. In highly secured facilities, some requirement may be incorporated requiring everyone to "show their ear." Moreover, the present system and method for ear biometrics may be a very good supplementary tool for other biometrics, such as facial recognition, where multiple biometric techniques are used in concert to provide accurate identifications by complementing strengths and weaknesses.

In light of these favorable biometric factors, there have been a few attempts in the past to study ear biometrics [A. Iannarelli, Ear Identification in Forensic Identification Series, Paramount Publishing, 1989]. However, in contrast to the present exemplary system and method, all of the traditional methods are based solely on 2D images and forensic evidences. One of the main innovations of the present system and method is the concept of using a 3D ear model as a foundation for biometric identification, thereby improving the performance and reliability of ear biometrics techniques.

Figure 4:
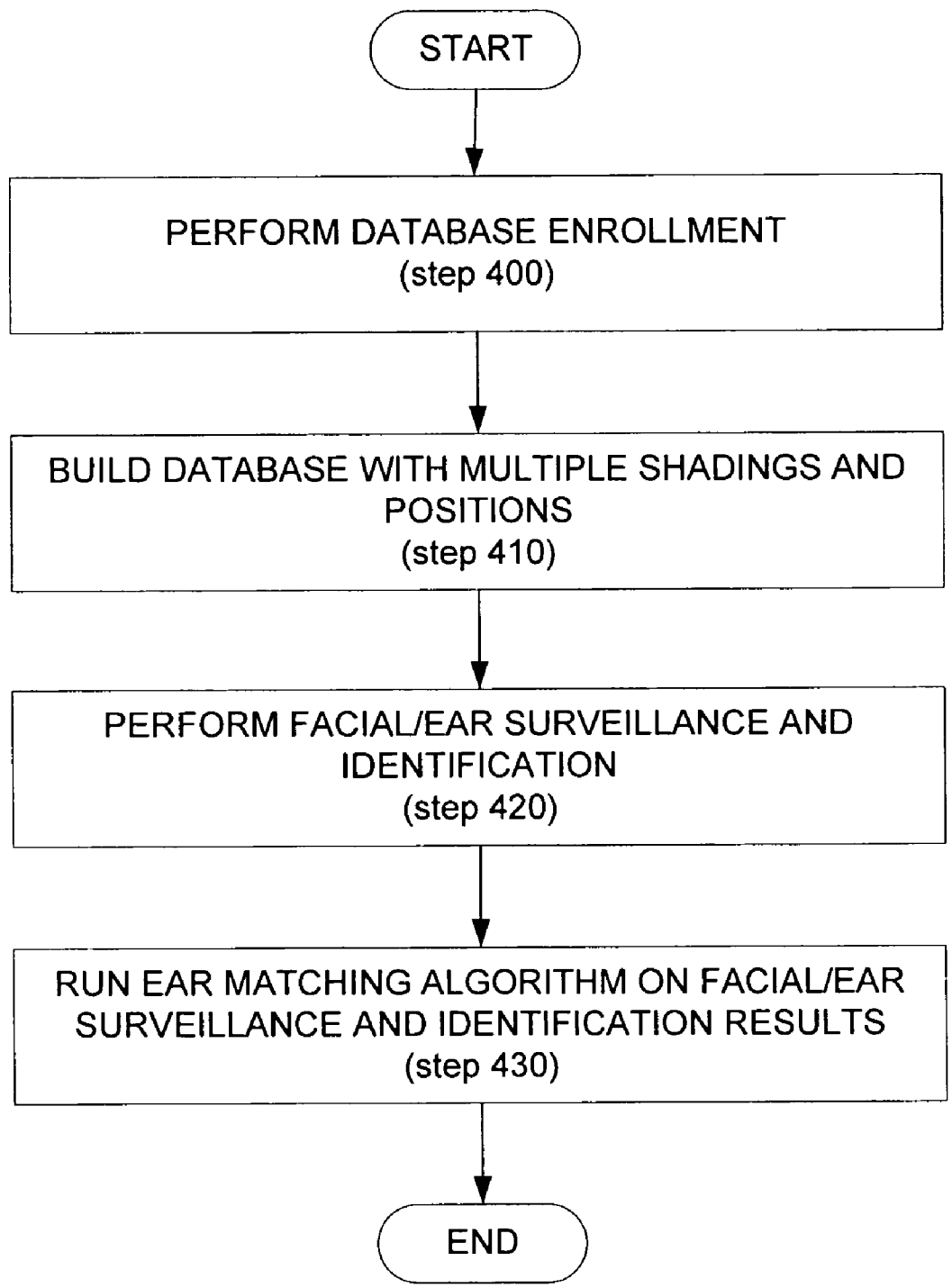
FIG. 4 is a side view illustrating identifiable features of a human ear according to one exemplary embodiment.

According to one exemplary embodiment, the present system and method are designed to accept 2D video images from existing surveillance cameras and use them, in conjunction with a database of multiple ear configurations, to survey and identify persons of interest. As illustrated in FIG. 4, the present method begins by first obtaining segmented ear images of a subject by performing a database enrollment process that uses face/ear extraction techniques (step 400). Once the segmented ear images are obtained, a database is built having a plurality of 2D images for each 3D image enrolled. The plurality of 2D images includes 2D representations having multiple representative shadings and positions of the original 3D image enrolled (step 410). According to one exemplary embodiment, the 3D ear database is generated via the 3D enrollment (to be further explained below) and contains ear images of all allowed personnel under various lighting and orientation conditions. Once the database is at least partially generated, the present system may perform facial/ear surveillance and identification (step 420) to identify personnel occupying an area of interest. Once an ear image is collected through the facial/ear surveillance and identification process (step 420), a 3D matching algorithm will be used to perform biometrics matching based on the ear images stored in the ear database (step 430). According to one exemplary embodiment, an ear matching algorithm will compare the incoming ear image with all images stored in the database and rank the matching scores. If there is a match (regardless of the lighting and orientation) with the ear models in the database, the subject is a legated person who has been granted permission by the system to occupy the area of interest. If, however, according to one exemplary embodiment, the incoming image does not generate any matches, the present system will provide an alarm or other noticeable signal to notify human operators of the unauthorized occupation of the area of interest. The above-mentioned method will be described in further detail below.

Enrollment for Building Ear Image Database

As illustrated in FIG. 4, the present system and method begins by performing a database enrollment process. While most traditional image based identification techniques, such as facial recognition, employ a 2D template matching or graphics matching approach for finding the similarity of two biometric patterns, the present system and method incorporate a 3D enrollment process. Typical 2D Face-ID systems include a 2D face image database running on a host computer, 2D video cameras for capturing the facial/ear images of subjects, and matching software that extracts the features from the 2D image and compares these feature sets with those from the database to determine a "match" within a certain confidence level.

These traditional 2D image based biometric systems are inherently sensitive to changes in variation and lighting conditions. For example, in the facial recognition case, some major drawbacks of existing 2D face ID techniques include a vulnerability to changes in lighting conditions (subject image should have similar lighting with the ones stored in the image database), and vulnerability to changes in face orientation (only function with <15° variation). These fundamental restrictions greatly limit the capability of current face-ID systems in effectively performing face identification functions. Consequently, the match-rate for existing face-ID systems in real-world applications is very low (below 90%).

The human ear is a three-dimensional (3D) object with each ear having its own unique 3D surface profile. The present exemplary system and method utilizes the 3D nature of the human ear in conjunction with its 2D texture information for a rapid and accurate Ear-ID.

The present 3D ear biometrics identification system and method is able to compare a subject image acquired by surveillance cameras to images within a unique three-dimensional ear image database that stores images of faces with multiple possible viewing perspectives and orientations. As will be further explained below, the incorporation of the three-dimensional ear image database will greatly reduce the difficulty for a 2D ear-matching algorithm to determine the similarity of an ear image stored in the database.

In order to improve the match-rate for the present biometric ear-matching system and method, a 3D ear database enrollment process is incorporated. FIG. 1 illustrates an exemplary embodiment of a system (100) that incorporates a 3D camera (120) during the "enrollment process." As illustrated in FIG. 1, the present exemplary system (100) includes a person (110) registering with the database by having a three-dimensional image generated by a 3D camera (120). The 3D camera then exports the collected 3D image into a computing device (130) where it is manipulated into a plurality of 2D representations having various shading and orientation (140). Accordingly, the present enrollment system (100) is responsible for acquiring 3D color ear images of those persons (110) who are supposed to be enrolled in the database. Once a 3D ear image is taken, 3D enrollment software running on the host computing device (130) will automatically process the 3D ear image and systematically generate multiple 2D images from a pre-defined number of orientations (perspectives) and illumination conditions (140).

The ear model database is established using the present system (100) prior to, or simultaneous with any surveillance functions. As illustrated in FIG. 1, the enrollment process begins with the 3D camera (120) generating a 3D image of the person (110) enrolling in the database. According to one exemplary embodiment, the 3D camera (120) used in generating the 3D image is a Rainbow 3D camera developed by Genex Technologies. According to this exemplary embodiment, the Rainbow 3D camera is used to acquire accurate 3D ear models of the allowable personnel. The 3D model with high resolution texture overlay provides the capability of digitally producing any number of 2D ear images under any lighting and orientation conditions as described in further detail below with reference to FIGS. 6, 7, and 8.

While the 3D camera illustrated above is described in the context of a Rainbow 3D camera developed by Genex Technologies, any 3D imaging device that is able to produce digital 3D images of a human face/ear in one snap shot may be used. According to one exemplary embodiment, each pixel on the 3D image includes not only the (x, y, z) coordinate, but also the (r, g, b) color information. Since a 3D image can be digitally rotated in multiple viewing angles, a single 3D image is able to be used to generate multiple 2D facial images of the same person from very different perspectives According to one exemplary embodiment, the 3D images are acquired according to the 3D acquisition methods disclosed, for example, in U.S. Pat. No. 5,675,407, issued Oct. 7, 1997 to Geng; U.S. Pat. No. 6,147,760, issued Nov. 14, 2000 to Geng and U.S. Pat. No. 6,028,672, issued Feb. 3, 2000 to Geng; U.S. Provisional Patent Application No. 60/178,695, filed Jan. 28, 2000, entitled "Improvement on the 3D Imaging Methods and Apparatus;" U.S. Provisional Patent Application No. 60/180,045, filed Feb. 4, 2000, entitled "A High Speed Full-Frame Laser 3D Imager;" U.S. patent application Ser. No. 09/617,687 filed Jul. 17, 2000, entitled "Method & Apparatus for Modeling Via A 3D Image Mosaic System;" U.S. patent application Ser. No. 09/770,124, filed Jan. 26, 2001, entitled "3D Surface Profile Imaging Method & Apparatus Using Single Spectral Light Condition;" and U.S. patent application Ser. No. 09/777,027, filed Feb. 5, 2001, entitled "High Speed 3D Imager." All of which are incorporated herein by reference in their entireties.

Figure 5A:
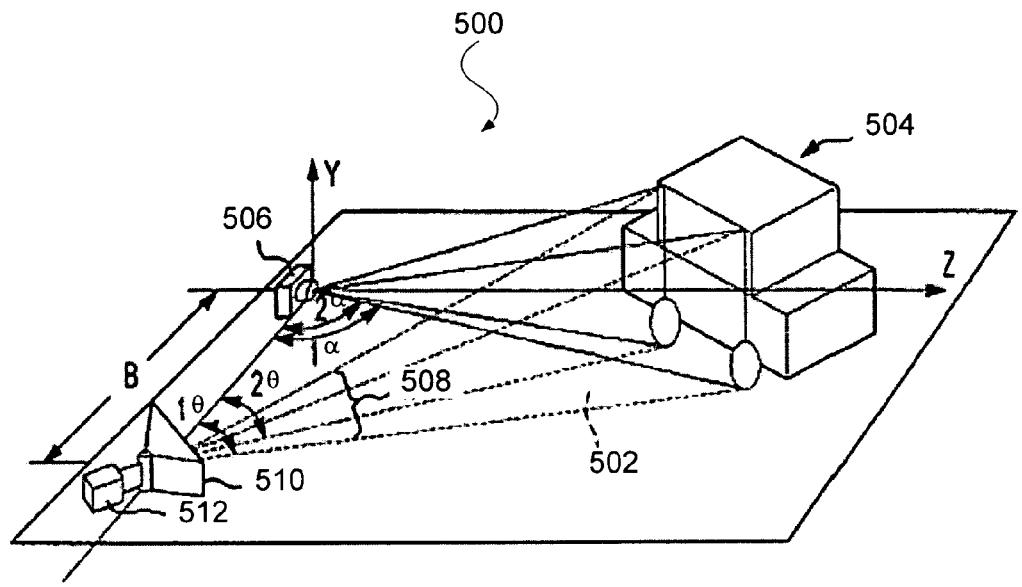
FIG. 5A is a block diagram illustrating a three-dimensional imaging method according to one exemplary embodiment.

FIG. 5A illustrates an exemplary triangulation system (500) that may be employed by the 3D camera according to one exemplary embodiment. As illustrated in FIG. 5A, all visible points on the object's surface (504) are obtained via the triangulation method. As can be seen in FIG. 5A, the light projector (512) generates a fan beam of light (508). The fan beam (508) is broad spectrum light (i.e., white light) which passes through a linear variable wavelength filter (LVWF) (510) to illuminate one or more three-dimensional objects (504) in the scene with a pattern of light rays possessing a rainbow-like spectrum distribution. The fan beam of light (508) is composed of multiple vertical planes of light (502), or "light sheets", each plane having a given projection angle and wavelength. Because of the fixed geometric relationship among the light source (512), the lens of the camera (506), and the LVWF (510), there exists a one-to-one correspondence between the projection angle ($\theta$) of the vertical plane of light and the wavelength ($\lambda$) of the light ray. Note that although the wavelength variations are shown in FIG. 5A to occur from side to side across the object (504) being imaged, it will be understood by those skilled in the art that the variations in wavelength could also be made from top to bottom across the object (504) or scene being imaged.

The light reflected from the object (504) surface is then detected by the camera (506). According to one exemplary embodiment, the camera (506) used by the present system and method is a CCD camera. If a visible spectrum range LVWF (100–700 nm) is used, the color detected by the camera pixels is determined by the proportion of its primary color Red, Green, and Blue components (RGB). The color spectrum of each pixel has a one-to-one correspondence with the projection angle ($\theta$) of the plane of light due to the fixed geometry of the camera (506) lens and the LVWF (510) characteristics. Therefore, the color of light received by the camera (506) can be used to determine the angle $\theta$ at which that light left the light projector (512) through the LVWF (510).

As described above, the angle $\alpha$ is determined by the physical relationship between the camera (506) and the coordinates of each pixel on the camera's imaging plane. The baseline B between the camera's (506) focal point and the center of the cylindrical lens of the light projector (512) is fixed and known. Given the value for angles $\alpha$ and $\theta$, together with the known baseline length B, all necessary information is provided to easily determine the full frame of three-dimensional range values (x,y,z) for any and every visible spot on the surface of the objects (504) seen by the camera (506).

While the camera (506) illustrated in FIG. 5A effectively produces full frame three-dimensional range values for any and every visible spot on the surface of an object (504) using light generated by a LVFW (510), any number of light source and wavelengths may be used to generate the 3D images including, but in no way limited to, a UV light source, an infrared light source, a monochromatic light source, etc.

Figure 5B:
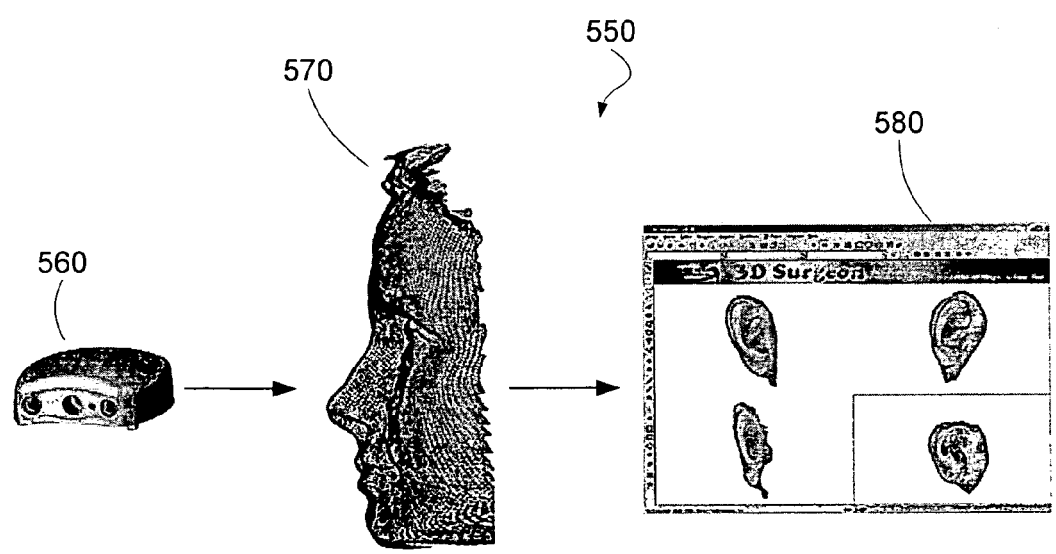
FIG. 5B is a data flow chart illustrating three-dimensional image collection according to one exemplary embodiment.

FIG. 5B further illustrates a data flow chart (550) used to generate a 3D facial image. As illustrated in FIG. 5B, GENEX's Rainbow 3D camera or another 3D rendering camera (560), may generate a 3D rendering of a facial profile (570). Once the facial profile (570) has been generated, it may be transmitted to a computing device hosting a software application (580) configured to generate multiple 2D images of the facial profile in different perspectives based on the 3D facial image.

3D Image Processing Technique to Produce Ear Images under Different Lightings

Based on an ear-to-ear 3D face model, we can use a 3D rendering method to produce multiple 2D face/ear images of the same person viewed from different perspectives. This will greatly reduce the difficulty for a 2D face-matching algorithm to determine the similarity of a facial image with that stored in the database, since there are many images from multiple possible perspectives for the same subject in the database.

One advantage of acquiring a 3D digital face/ear model as illustrated above versus acquiring a 2D ear image is that all geometric information of the 3D ear structure is preserved so that the illumination source(s) can be artificially manipulated to generate multiple simulated ear images under various lighting conditions—all from a single original 3D digital ear model. According to one exemplary embodiment, the multiple ear images are generated based on the 3D ear geometry, surface reflectance function, location and strength of the added light source(s), and original high-resolution texture map. In contrast, when using a 2D ear image, it is impossible to create any geometric-based lighting appearance due to a lack of 3D information.

Once the 3D ear image is collected using the 3D imaging methods illustrated above, the system builds a database containing 2D images with various illumination conditions based on the single 3D model in conjunction with its texture information. Traditional modeling methods usually fail to appear realistic under changes in lighting, viewpoint, and/or expression due to the complex reflectance properties of the ear. More specifically, skin reflects light both diffusely and specularly. Consequently, the reflectance varies with spatial locations. This variation is impossible to accurately simulate on a 2D image containing no 3D spatial coordinates.

Figure 6:
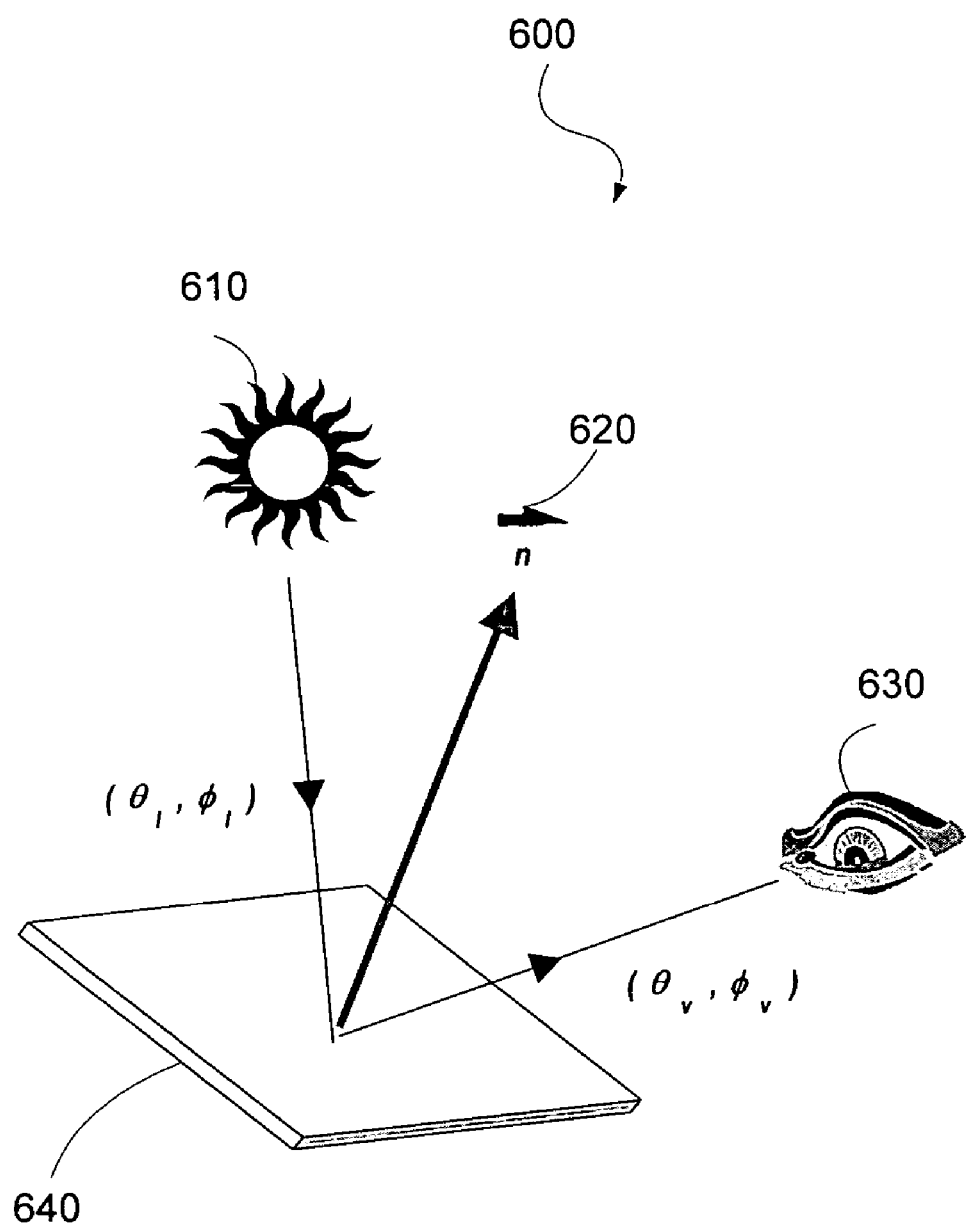
FIG. 6 is a diagram illustrating a surface reflectance model according to one exemplary embodiment.

According to one exemplary embodiment of the present system and method, the present system produces various face and ear images based on the "3D modulation" of the 2D texture map with the 3D reflectance model. FIG. 6 illustrates the basic relationship and the bi-directional reflectance distribution function (BRDF) definition according to one exemplary embodiment. According to the model (600) illustrated in FIG. 6, one can determine how bright a surface (640) appears to a viewer (630) when viewed from a first direction (θv, φv). According to FIG. 6, the determination may be made by identifying a second direction (θi, φi) from which light from a light source (610) falls on the surface (640) in relation to the direction normal (620) of the surface. Further details of the BRDF definition can be found from "Robot Vision", B. K. Horn, MIT Press, 1980, and "Color", G. H. Healey, et al, Jones and Bartlett Publisher, 1992, both of which are incorporated by reference in their entirety. By combining the BRDF definition with computer graphics methods, the present system and method generate appropriate appearance and shading of a 3D surface, such as an ear, based on the surface normal (620) geometric locations of light source(s) (610) and viewpoints (630).

Figure 7:
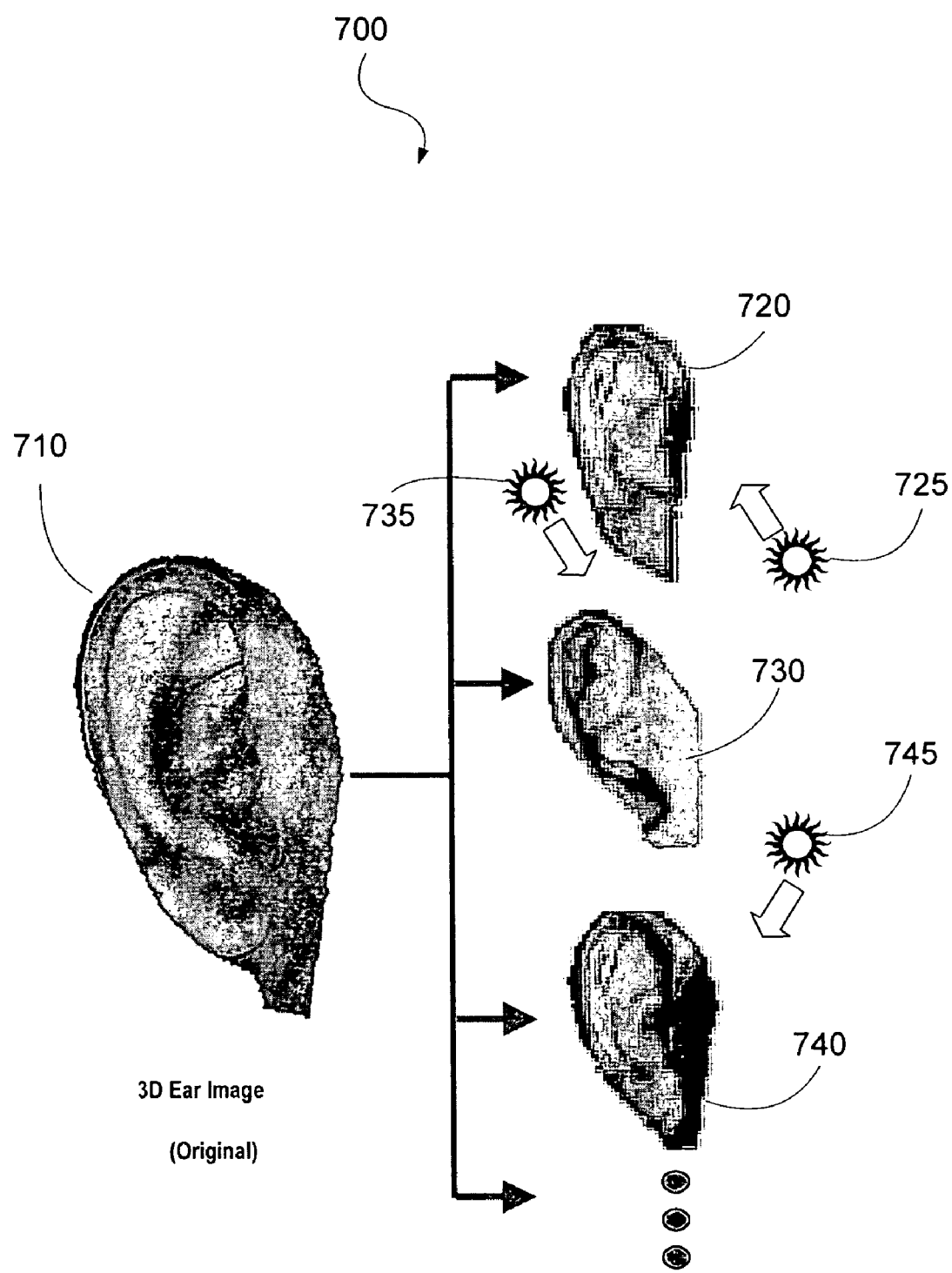
FIG. 7 is a method diagram illustrating the generation of multiple 2D ear images under various lighting conditions according to one exemplary embodiment.

FIG. 7 is a method diagram (700) illustrating a plurality of two dimensional ear images (720, 730, 740) generated using the above mentioned computer graphics methods. As illustrated in FIG. 7, a single 3D ear image (710) may be used to generate multiple ear images (720, 730, 740) under various lighting conditions. According to the exemplary embodiment illustrated in FIG. 7, an artificial light source (725, 735, 745) is oriented with respect to each respective 2D ear image (720, 730, 740) to be generated. Once the artificial light sources (725, 735, 745) are oriented, the present system and method uses computer graphics methods to combine the 2D texture ($r_i$, $g_i$, $b_i$) information at each pixel i with a modulation $m_i$ calculated from the reflectance model based on the 3D geometric shape under the various artificially placed lighting source(s) (720, 730, 740). The final color component at each independent pixel i becomes $m_i{}^*(r_i, g_i, b_i)$.

While the present exemplary embodiment is illustrated in the context of artificially lighting the identified 3D ear image (710) under white light conditions, any number of light sources may be used including, but in no way limited to, white light sources, ultraviolet (UV) light sources, monochromatic light sources, and infrared (IR) light sources. Accordingly, the present system and method may incorporate, according to one exemplary embodiment, a practical algorithm and software configured to generate face and/or ear images under various lighting conditions.

Figure 8:
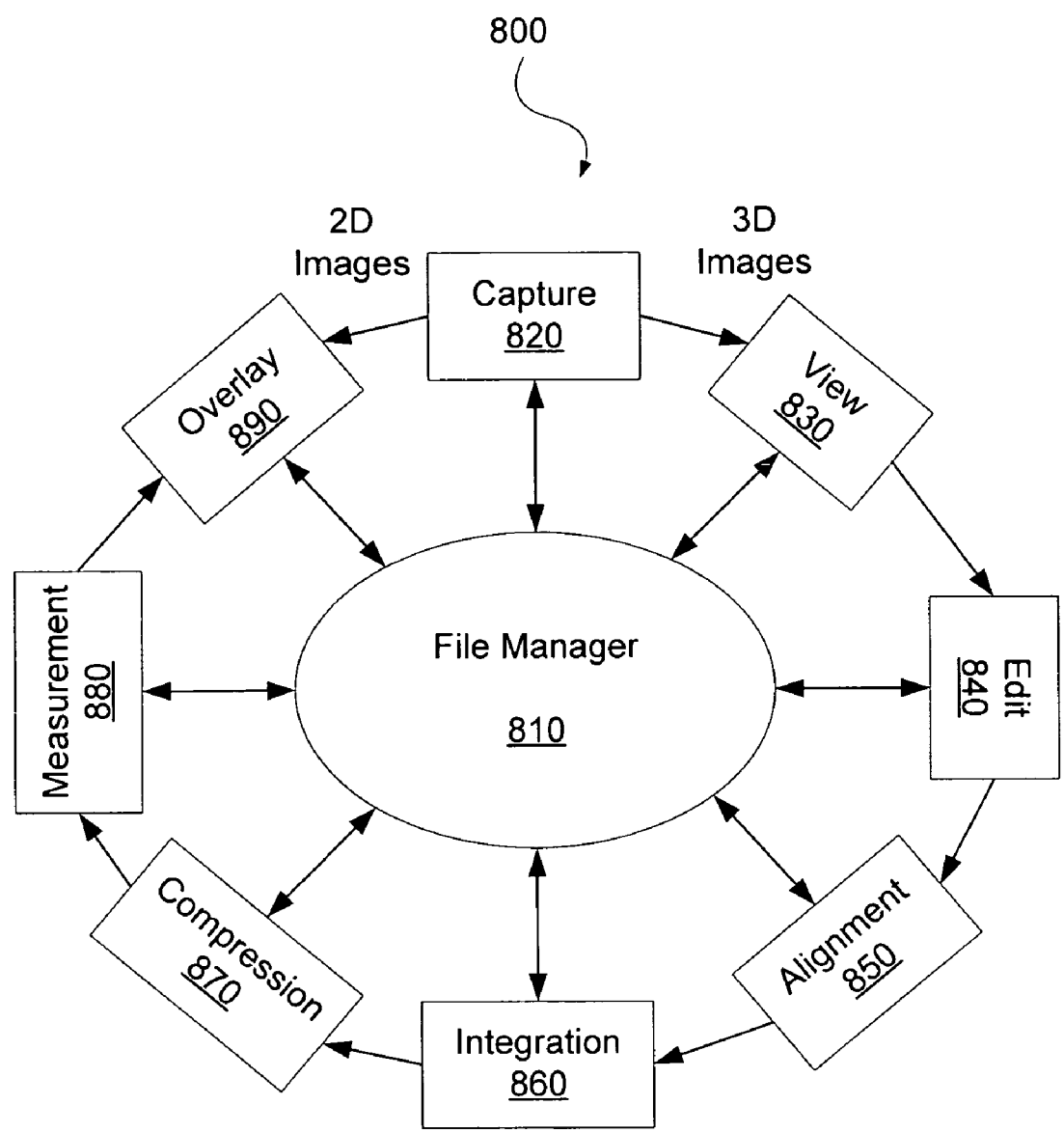
FIG. 8 is a system flow diagram illustrating a 3D image processing software package according to one exemplary embodiment.

FIG. 8 illustrates 3D image processing software (800) used to produce a plurality of face and/or ear images under various lighting conditions, according to one exemplary embodiment. As illustrated in FIG. 8, the comprehensive 3D image processing software package (800) is configured to support 3D image acquisition (820), visualization (rendering) (830), editing (840), alignment (850), merge or integration (860), compression (870), measurement (880), and texture overlay (890). All of these operations are controlled by the file manager (810). According to one exemplary embodiment, the present 3D image processing software is configured to establish an automatic function set that allows for systematic rendering of a 3D model from multiple predefined viewing angles. According to this embodiment, the multiple predefined viewing angles may be from 90-degree right side view to 90-degree left side view, and 45-degree top view to 45-degree bottom view, with an interval of 30 degrees. However, any number of viewing angles may be selected and/or programmed by the user. Since a 3D image captured according to the exemplary methods illustrated above can be digitally rotated in multiple viewing angles, a single 3D image is able to generate multiple 2D facial/ear images of the same person from very different perspectives. With the Rainbow 3D camera and the present enhanced software functions, the present exemplary system and method produce a 3D facial image database within which there are multiple 2D images of the same person from different perspectives. These images are then stored in the ear database for real-time surveillance use.

Facial/Ear Identification and Surveillance Technology

Figure 9:
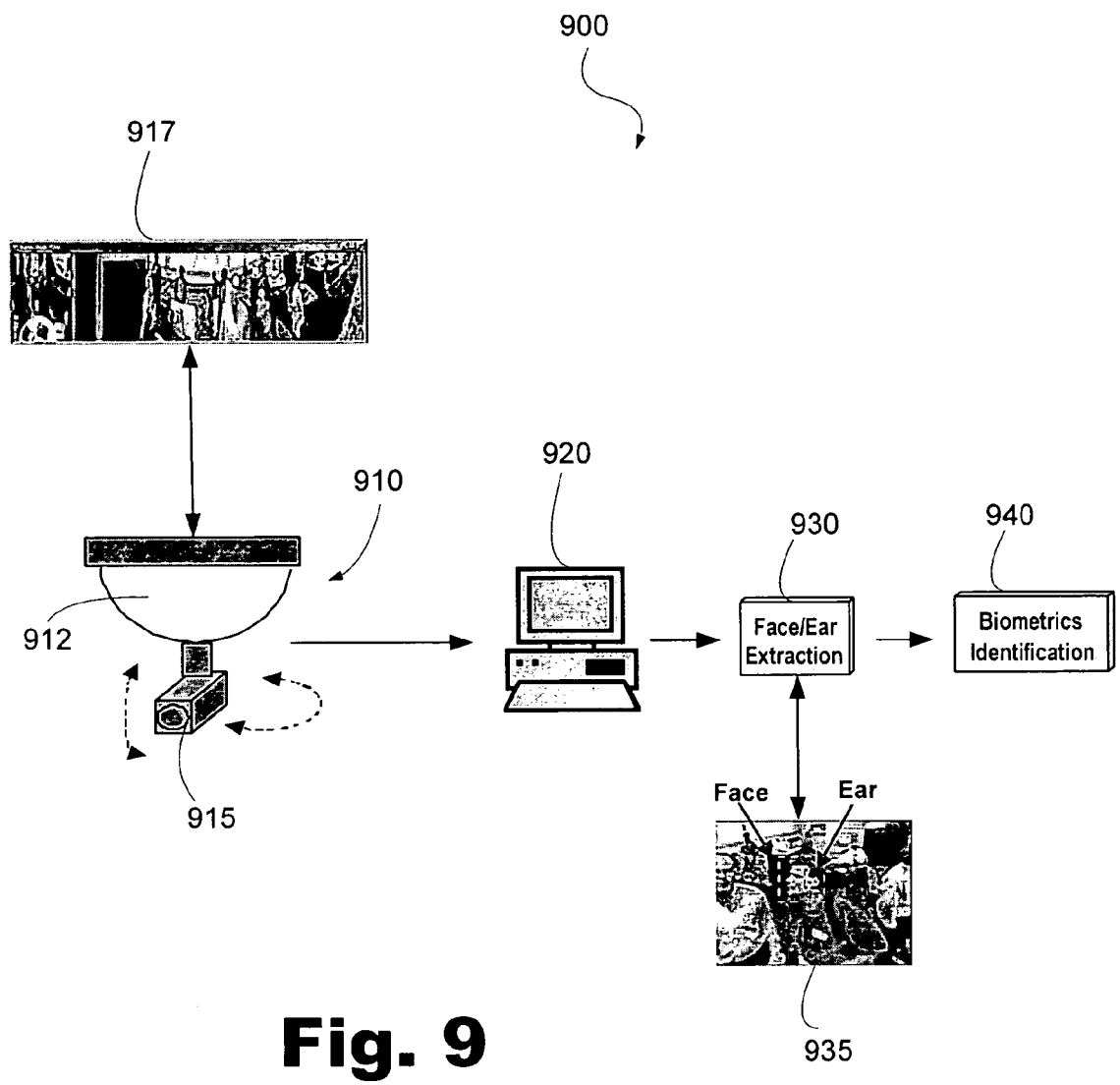
FIG. 9 is a simplified block diagram illustrating the components of a complete video surveillance system incorporating a 3D ear biometrics technique according to one exemplary embodiment.

FIG. 9 illustrates an exemplary surveillance system (900) that incorporates the above-mentioned database and image collection methods. As illustrated according to one exemplary embodiment in FIG. 9, a surveillance system (900) includes a camera system (910) including an omni-directional camera (912) which surveys an area of interest in a panoramic view (917). A pan/tilt/zoom (PTZ) camera (915) also forms a portion of the camera system (910). The camera system (910) is subsequently communicatively coupled to a computing device (920) configured to perform a facial/ear extraction (930) on a collected image (935) and perform a biometric identification using 3D ear image matching techniques explained in detail below. According to the exemplary embodiment illustrated in FIG. 9, currently installed high-resolution pan/tilt/zoom cameras (915) may be used for facia/ear identification based on the "global" sensing capability of an omnidirectional camera (912). Once an event/person of interest is detected by the ultra-wide-viewing-angle omni-camera (912), the size and location of the suspicious person will be used to drive the PTZ camera (915) to acquire high-resolution images of the event/person. This novel imaging technology allows for both the ultra-wide viewing angle and high-resolution image acquisition ideal for facial and ear identification uses. The proposed 3D Ear ID technology, together with advanced facial recognition systems, can perform reliable surveillance and identification functions, thus providing better protection to highly secured facilities.

Figure 10:
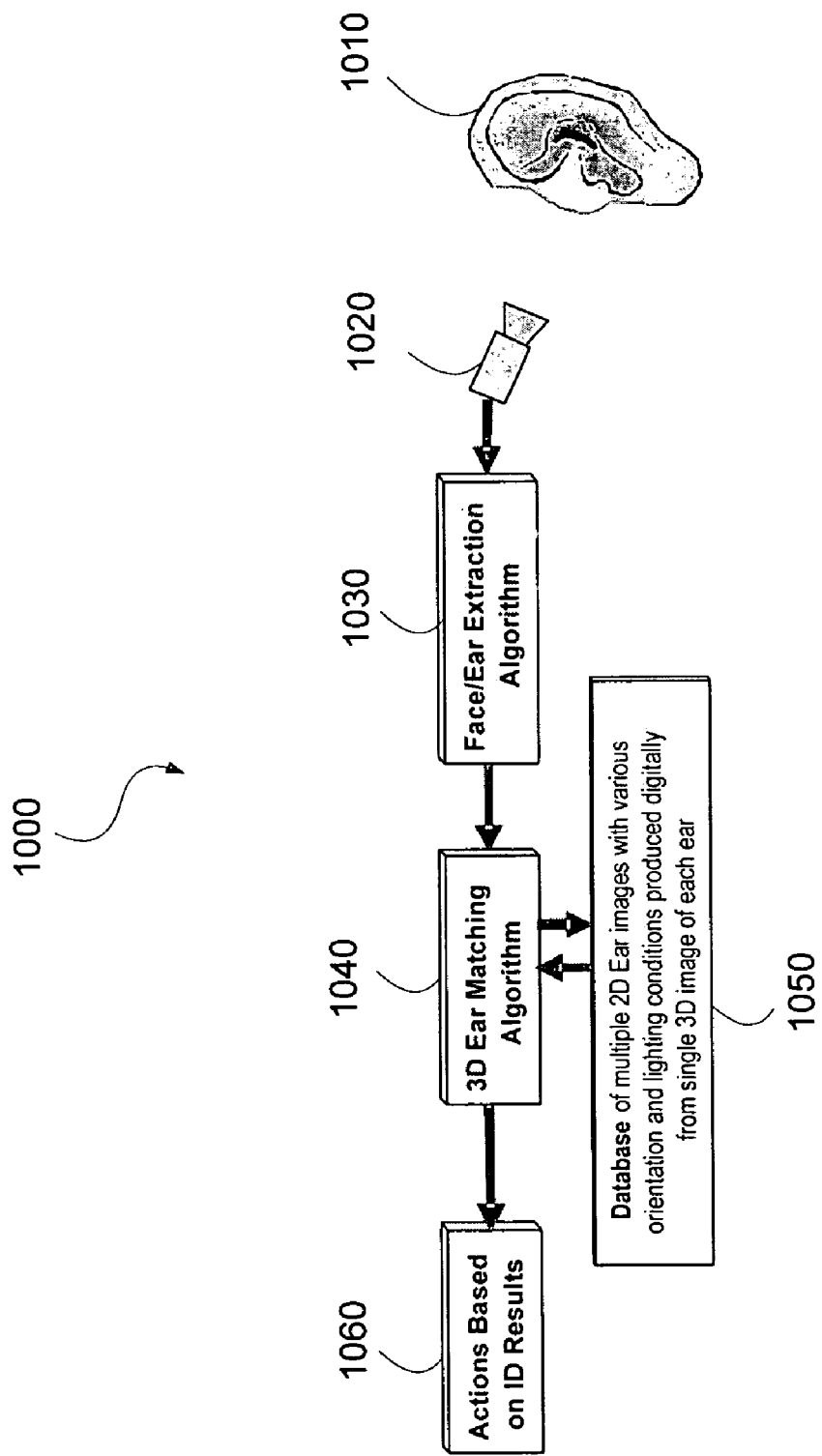
FIG. 10 is a flow chart illustrating an order of operations for a video surveillance system incorporating a 3D ear biometrics technique according to one exemplary embodiment.

FIG. 10 is a block diagram illustrating an information process flow (1000) that occurs in the computing device (920) illustrated in FIG. 9 according to one exemplary embodiment. As illustrated in FIG. 10, the PTZ camera (1020) generates a high-resolution 2D image of a face/ear of interest (1010). The high resolution 2D image of the face/ear of interest (1010) is then transmitted from the PTZ camera (1020) to the computing device where a face/ear extraction algorithm is performed (1030). The face/ear extraction algorithm (1030) extracts features of interest from a received 2D image, an ear for example, and transmits the extracted image to a 3D ear matching algorithm where it may be compared to a 2D ear image database. Once a 2D image of the ear of interest is extracted from the received image, the computing device (920; FIG. 9) performs a 3D ear matching algorithm (1040) while accessing a generated 2D ear image database (1050) that was generated as explained in detail above. The ear matching algorithm (1040) is an ear recognition algorithm that is used to correlate the received ear image with a 2D image stored in the 2D ear image database (1050). The methods used by the ear matching algorithm (1040) will be further described in detail below. Once the 3D ear matching algorithm (1040) has been performed, the surveillance system (900; FIG. 9) may activate an alarm, transmit a notification signal to a pre-determined person, or perform another response action based on the identification results (1060) produced by the 3D ear matching algorithm. Further methods for performing the 3D ear matching algorithm (1040) will now be described in further detail below.

3D Ear Image Matching Techniques

Figure 11:
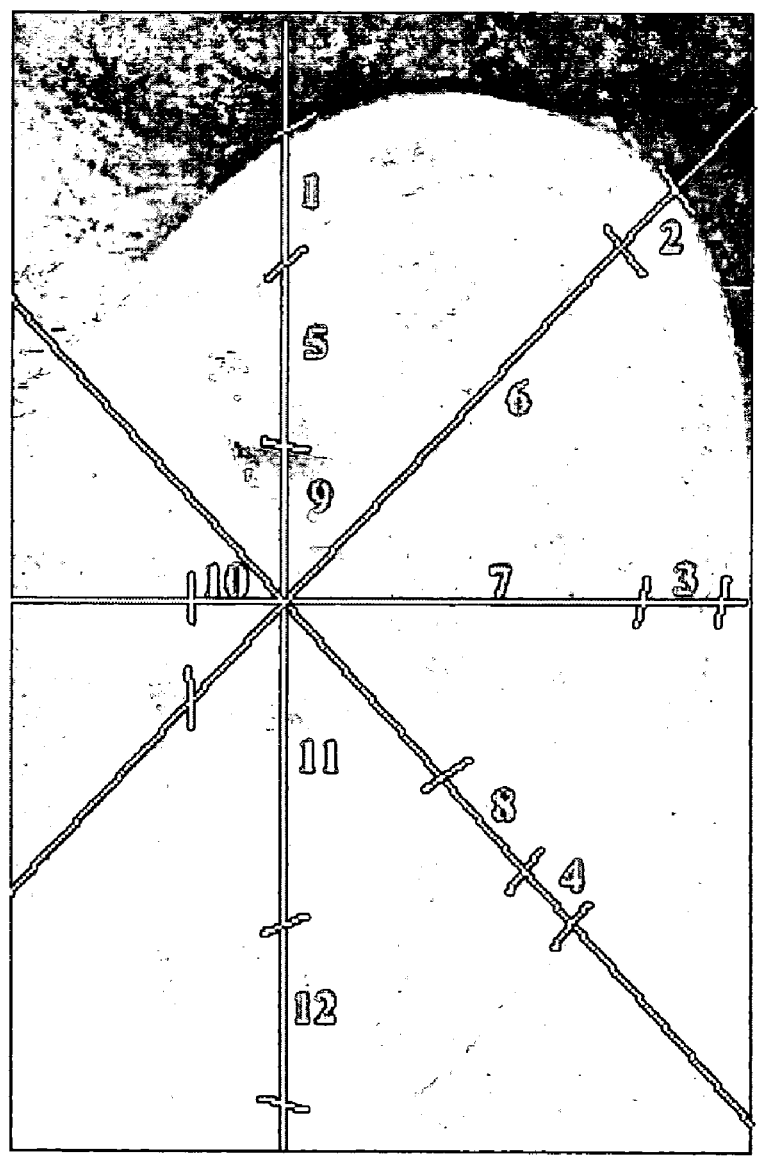
FIG. 11 is a diagram illustrating points of interest on a human ear when performing an ear identification method according to one exemplary embodiment.

According to one exemplary embodiment, the present 3D ear matching algorithm (1040) may function according to the Iannarelli ear measurement system (1100) developed by Alfred Iannarelli. The "Iannarelli System," illustrated in FIG. 11, is based upon 12 measurements (1–12) as shown in FIG. 11. The locations shown are measured from specially aligned and normalized photographs of the ear. To normalize and align the images, they are projected onto a standard "Iannarelli Inscribed" enlarging easel which is moved horizontally and vertically until the ear image projects onto a prescribed space on the easel. Such alignment process is typically performed manually and the measurement is taken in units of 4 mm and assigned an integer distance value. These 12 measurements, along with information regarding gender and race, are then used for biometric identification. An automated method of the Iannarelli System may be performed by the present 3D ear matching algorithm (1040).

However, all of the measurements of the "Iannarelli System" are based on the location of a center point, which if not exactly and consistently located, results in incorrect subsequent measurements. According to one exemplary embodiment, the present 3D ear matching algorithm (1040) eliminates this vulnerability by performing an Eigen-Ear based 3D ear image matching technique.

The "Eigen-Ear" based recognition approach extends the "Eigenface" approach developed by Pentland group [Turk & Pentland, Eigenfaces for recognition, J. Cognitive Neuroscience, 3(1), 1991] to the ear recognition applications. Accordingly, the Eigen-Ear based recognition approach is an efficient coding approach for comparing ear features with a database of previously stored images, which are similarly encoded.

The underlining concept of the "Eigen-Ear" based recognition approach is to find a set of ear images called Eigen-Ears (i.e., the eigenvectors of the covariance matrix of a given set of ear images) so that all ear images can be represented by a linear combination of the Eigen-Ears. By choosing "M" most dominant eigenvectors in the eigenspace based on the eigenvalues, an ear image can be approximated using only a lower dimension subspace span.

According to one exemplary embodiment of the Eigen-Ear based recognition approach, each 2D ear image $I(x,y)$ is represented with dimension N×N into a one dimensional vector P with a dimension of $N^2$. The training set of images is $P_1, P_2, \ldots, P_M$. Accordingly, the average ear of the set is defined as $$\overline{P} = \frac{1}{M}\sum_{i=1}^{M} P_i.$$

Each vector differs from the average by: $Q_i = P_i - \overline{P}$. Therefore, the covariance matrix can be formed as:

$$C = \frac{1}{M}\sum_{i=1}^{M} Q_i Q_i^T = \frac{1}{M} AA^T,$$

where $A = [Q_1 \; Q_2 \; \ldots \; Q_m]$ is a $N^2 \times M$ matrix, and C is a $N^2 \times N^2$ matrix. Calculating an eigenstructure of such high dimensional matrix is of course computationally expensive. In order to reduce the computational expense of the high dimensional matrix, a more efficient method was developed.

Notice that the M×M matrix $L = A^T A$ and its eigenvector $v_i$ can be easily calculated: $A^T A v_i = \mu_i v_i$, $\forall i \in \{1, 2, \ldots, M\}$. Multiplying both sides of the equation from the left by A, we get:

$$AA^T A v_i = \mu_i A v_i, \; \forall i \in \{1, 2, \ldots, M\}$$

This means that $Av_i$ and $\mu_i$, $\forall i \in \{1, 2, \ldots, M\}$ are the eigenvectors and eigenvalues of C respectively.

From this obvious relationship, we can find the eigen-ears of a 2D ear image by calculating the M eigenvectors of $L = A^T A$. The Eigen-Ears $d_i$ are then:

$$d_i = \sum_{k=1}^{M} v_{jk} Q_k, \; j = 1, 2, \cdots, M \tag{1}$$

This method reduces the calculations from an order of $N^2$ to an order of M. The eigenears best suited for spanning the ear space have the highest eigenvalues according to the above method.

Classifying an Ear Image Using Eigen-Ear

Given a new 2D ear image P, EigenEar components are transformed by projecting the image onto the EigenEars with dot product:

$$w_k = d_k^T (P - \overline{P}), \; k = 1, 2, \ldots, M \tag{2}$$

The weights wk form a vector $W = [w_1 w_2 \ldots w_M]$. This vector can then be compared to the existing vectors $W_k$ corresponding to 2D ear images located in the database. The standard method (Gaussian nearest neighbor classifier) is then used to find the vector in the database that minimizes the Euclidean distance: $\epsilon_k = \|W - W_k\|^2$. The new 2D ear image P is classified as belonging to a class k, if $\epsilon_k$ is below a chosen threshold value $\theta$. Otherwise, the ear will be classified as "unknown."

Eigen-Ear Recognition Procedure

The exemplary embodiment of an EigenEar recognition procedure can be summarized in the following steps: collect a set of characteristic ear images, calculate the matrix $L = A^T A$, and calculate its eigenvectors and eigenvalues. Choose M vectors with the highest associated eigenvalues. Compute the EigenEars $d_i$ according to equation (1) above. For each known individual, project the ear image to the ear space according to equation (2), and form the class $W_k$. Determine the maximum allowable threshold $\theta_k$. Classify the incoming ear image by computing its weight vector W and comparing the distance to the known classes.

The 3D Ear-ID matching algorithms can select the images that have a similar illumination pattern for a search, thereby greatly increasing the matching efficiency and accuracy. Because these simulated ear images have a variety of appearances, the Ear-ID matching algorithms may be able to find a match for a poorly-lit subject image that was previously not possible for the search-engine to find based on single 2D ear image. Using the above-mentioned EigenEar classification and recognition procedures, the 3D ear matching algorithm (1040; FIG. 10) can quickly and accurately determine whether the person corresponding to the collected 2D ear image is authorized to be in a designated area. Consequently, the exemplary ear biometrics technique illustrated above, together with a more mature facial/ear recognition technique, could significantly enhance the effectiveness of human identification and expand the applicability of existing biometrics technologies.

In conclusion, the present system and method effectively provide a viable solution to protecting highly secured facilities. Using the exemplary system and method, security systems can be significantly improved at airports, government buildings, military facilities, sport events, schools, warehouses, ports/piers/ships, embassies, or any other location where selective entrance is desired. Additionally, the present system and method may be used to increase the intelligence level of existing security systems (e.g., notifying authorities when a person appears multiple days at one site or is spotted at different sites and the person is not known to the system).

The present system and method may be added as a supplementary tool to enhance the reliability and performance of existing identification systems. In cases where both facial and ear images are available, the ear ID technique explained above would serve as a verification tool to reduce search space, enhance reliability, and reduce false alarm rates. In the cases where only side-view images are available, the present ear identification methods may independently serve as an effective identification tool to provide rankings of matching scores.

Moreover, the present exemplary systems and methods are suitable for video surveillance applications since they are designed to handle non-straight-on images, non-cooperative subjects, and individuals at a distance. Additionally, the present system and method may be performed by existing video surveillance infrastructure or existing high performance and low-cost of-the-shelf products.

The preceding description has been presented only to illustrate and describe exemplary embodiments of the present system and method. It is not intended to be exhaustive or to limit the present system and method to any precise form disclosed. Many modifications and variations are possible in light of the above teaching. It is intended that the scope of the present system and method be defined by the following claims.

What is claimed is:

1. A method of automatic human identification, said method comprising matching an image of a subject's ear against a database of images of ears of identified subjects to identify said subject, wherein said database of images comprises a three-dimensional image of an ear of each of a plurality of identified subjects and a plurality of two-dimensional images generated from each of said three-dimensional images, wherein each of said two-dimensional images represents a varied orientation or illumination condition on a corresponding tree-dimensional image.

2. The method of claim 1, further comprising generating said database of images of identified ears.

3. The method of claim 2, wherein said generating said database of images comprises:
   generating a three-dimensional image of an identified subject's ear; and
   generating said plurality of two-dimensional images of said identified subject's ear based on said three-dimensional image.

4. The method of claim 3, wherein said step of generating a three-dimensional image of an identified subject's ear comprises:
   illuminating said subject with a light source having a variable intensity pattern;
   imaging said illuminated subject with a charge-coupled device camera, said charge coupled device camera separated from said light source by a known baseline distance; and
   calculating a distance to a point on said subject using a triangulation method based on a baseline distance between said light source and said camera, an angle between said camera and said baseline, and an angle at which light striking said point is emitted by said light source as determined from an intensity of a light striking said point.

5. The method of claim 1, wherein said step of matching an image of a subject's ear against a database further comprises performing an Eigen-ear method.

6. The method of claim 5, wherein said Eigen-ear method comprises:
   performing an Eigen-ear classification procedure; and
   performing an Eigen-ear recognition procedure.

7. The method of claim 6, wherein said Eigen-ear classification procedure comprises computing a weight vector of said image of a subject's ear.

8. The method of claim 7, wherein said Eigen-ear recognition procedure comprises identifying said image of a subject's ear as belonging to a class if a vector in said database is found that minimizes a Euclidean distance to said weight vector below a threshold value.

9. The method of claim 1, wherein said image of a subject's ear is collected by a pan/tilt/zoom (PTZ) surveillance camera.

10. The method of claim 1, further comprising:
    surveying a location with an omnidirectional camera;
    acquiring a high-resolution image of said subject with a PTZ surveillance camera based on information provided by said omnidirectional camera; and
    generating said image of a subject's ear from said high-resolution image.

11. The method of claim 12, further comprising:
    matching an input image of an ear with images of said database.

12. A method of creating and using a database of ear images for automatic human identification comprising:
    generating a three-dimensional image of an ear for each of a number of identified people; and
    generating a database comprising a plurality of two-dimensional images based on each said three-dimensional image;
    wherein each of said plurality of two-dimensional images represents a varied orientation or illumination condition on said three-dimensional image.

13. The method of claim 12, wherein said step of generating a three-dimensional image of an identified person's ear comprises:
    illuminating said person with a light source having a variable intensity pattern;
    imaging said illuminated person with a charge-coupled device camera, said charge coupled device camera separated from said light source by a known baseline distance; and
    calculating a distance to a point on said person using a triangulation method based on a baseline distance between said light source and said camera, an angle between said camera and said baseline, and an angle at which light striking said point is emitted by said light source as determined from an intensity of a light striking said point.

14. The method of claim 11, wherein said step of matching an input image of an ear with images of said database comprises performing an Eigen-ear method.

15. The method of claim 14, wherein said Eigen-ear method comprises:
    performing an Eigen-ear classification procedure; and
    performing an Eigen-ear recognition procedure.

16. The method of claim 15, wherein said Eigen-ear classification procedure comprises computing a weight vector of said image of a subject's ear.

17. The method of claim 16, wherein said Eigen-ear recognition procedure comprises identifying said input image of an ear as belonging to a class if a vector in said database is found that minimizes a Euclidean distance to said weight vector below a threshold value.

18. The method of claim 11, wherein said input image of an ear is collected by a pan/tilt/zoom (PTZ) surveillance camera.

19. An image matching method comprising performing an Eigen-ears identification method, said method further comprising:
    performing an Eigen-ear classification procedure on a plurality of two-dimensional ear images; and
    performing an Eigen-ear recognition procedure on a received two-dimensional ear image,
    wherein said Eigen-ear classification procedure comprises:
        computing a weight vector of each of said two dimensional ear images;
        said plurality of two-dimensional ear images being classified according to said weight vectors; and
    wherein said Eigen-ear recognition procedure comprises:
        computing a weight vector of said received two-dimensional ear image; and
        identifying said received two-dimensional ear image as belonging to a class if one of said weight vectors minimizes a Euclidean distance to said weight vector of said two-dimensional ear image below a threshold value.

20. A system for three-dimensional biometric identification comprising:
    a camera system;
    a database of images of identified ears, wherein said database of images comprises a tree-dimensional image of an ear of each of a plurality of identified subjects and a plurality of two-dimensional images generated from each of said three-dimensional images, wherein each of said two-dimensional images represents a varied orientation or illumination condition on a corresponding three-dimensional image; and
    a computing device communicatively coupled to said camera system and to said database of images of identified ears;
    wherein said computing device is configured to match an image of a subject's ear acquired by said camera system against said database of images of identified ears to identify said subject.

21. The system of claim 20, wherein said camera system comprises:
    an omnidirectional camera; and
    a pan/tilt/zoom camera.

22. The system of claim 20, wherein said computing device is further configured to match an image of a subject's ear acquired by said camera system against said database of images of identified ears using an Eigen-ear method.

23. The system of claim 22, wherein said Eigen-ear method comprises
    performing an Eigen-ear classification procedure; and
    performing an Eigen-ear recognition procedure.

24. The system of claim 23, wherein said Eigen-ear classification procedure comprises computing a weight vector of said image of a subject's ear.

25. The system of claim 24, wherein said Eigen-ear recognition procedure comprises identifying said input image of an ear as belonging to a class if a vector in said database is found that minimizes a Euclidean distance to said weight vector below a threshold value.

26. The system of claim 20, wherein said computing device is further configured to perform a face/ear image extraction process on an image received from said camera system.

27. The system of claim 20, wherein said computing device is configured to generate an alarm signal if said image of a subject's ear does not match an image in said database of images of identified ears.

28. A system for three-dimensional biometric identification comprising:
    a means for generating a two-dimensional image of a subject's ear;
    a database of images of identified ears, wherein said database of images comprises a three-dimensional image of an ear of each of a plurality of identified subjects and a plurality of two-dimensional images generated from each of said three-dimensional images, wherein each of said two-dimensional images represents a varied orientation or illumination condition on a corresponding three-dimensional image; and
    a means for matching said two-dimensional image of a subject's ear against said database of images of identified ears to identify said subject.

29. The system of claim 28, wherein said means for generating a two-dimensional image of a subject's ear comprises a camera system.

30. The system of claim 28, wherein said means for matching is further configured to match an image of a subject's ear acquired by said means for generating a two-dimensional image against said database of images of identified ears using an Eigen-ear method.

31. The system of claim 30, wherein said Eigen-ear method comprises
    performing an Eigen-ear classification procedure; and
    performing an Eigen-ear recognition procedure.

32. The system of claim 31, wherein said Eigen-ear classification procedure comprises computing a weight vector of said image of a subject's ear.

33. The system of claim 32, wherein said Eigen-ear recognition procedure comprises identifying said input image of an ear as belonging to a class if a vector in said database is found that minimizes a Euclidean distance to said weight vector below a threshold value.

* * * * *

UNITED STATES PATENT AND TRADEMARK OFFICE
CERTIFICATE OF CORRECTION

| | |
|---|---|
| PATENT NO. | : 7,065,232 B2 |
| APPLICATION NO. | : 10/769393 |
| DATED | : June 20, 2006 |
| INVENTOR(S) | : Z. Jason Geng |

Page 1 of 1

It is certified that error appears in the above-identified patent and that said Letters Patent is hereby corrected as shown below:

Column 13, Line 49, change "tree-dimensional image" to – three-dimensional image Column 15, Line 37, change "tree-dimensional image" to – three-dimensional image Signed and Sealed this Twenty-second Day of August, 2006

JON W. DUDAS
*Director of the United States Patent and Trademark Office*